E. A. HILDING.
AIR VALVE FOR PNEUMATIC TIRES.
APPLICATION FILED SEPT. 12, 1916.
1,212,640.
Patented Jan. 16, 1917.
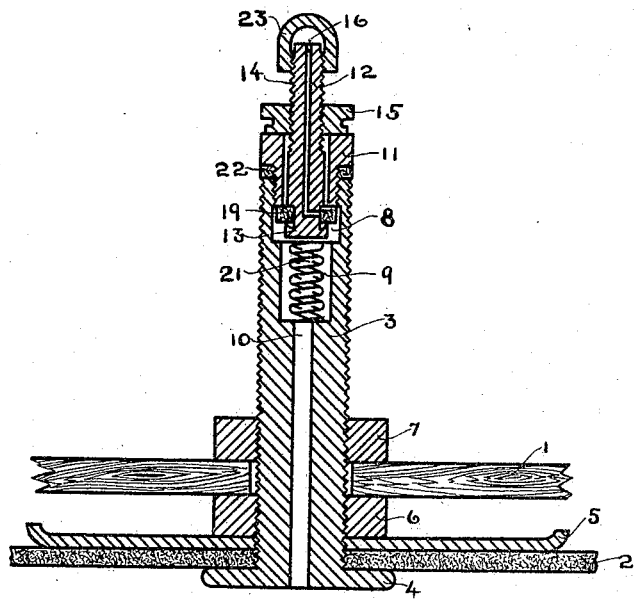
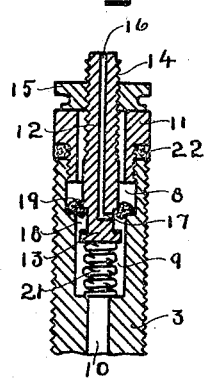
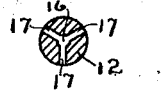
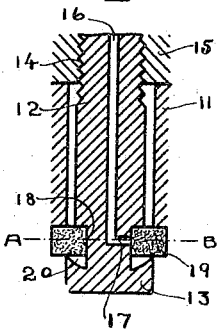
INVENTOR:
Ernst Alfred Hilding
By Wm Wallace White
ATTY.

UNITED STATES PATENT OFFICE.

ERNST ALFRED HILDING, OF LIDKÖPING, SWEDEN, ASSIGNOR TO AKTIEBOLAGET SVENSKA LUFTVENTILER, OF LIDKÖPING, SWEDEN.

AIR-VALVE FOR PNEUMATIC TIRES.

1,212,640.     Specification of Letters Patent.     Patented Jan. 16, 1917.

Application filed September 12, 1916. Serial No. 119,623.

*To all whom it may concern:*

Be it known that I, ERNST ALFRED HILDING, a subject of the King of Sweden, residing at Lidköping, in the county of Skaraborg and Kingdom of Sweden, have invented new and useful Improvements in and Relating to Air-Valves for Pneumatic Tires, of which the following is a specification.

In my U. S. A. patent application of the 11th April 1915 with Serial No. 44873 I have described an improved air valve for pneumatic tire adapted to be used in connection with bicycles as well as motor cars. On account of some inconvenient features in this improved valve, in particular the position of the tightening washer inside the tire which renders it somewhat difficult to inspect this washer and to substitute a fresh one for it when needed I have now improved this air valve as may be clearly understood by the following description.

According to this invention I place the washer inside the main sleeve of the valve body, where it may be tightened against a loosely fitted nut and thus can be easily removed when wanted without interfering with the fixed position of the valve body proper.

Another object of this invention is to facilitate the testing of the pressure inside the tire by means of a pressure gage temporarily fitted to the valve.

A further object of the same invention is to make it possible for the air, when the tire is being inflated, to enter the tire beyond the washer easily without it being necessary to slack the locking nut to any considerable degree.

Other features of this invention may be clearly understood from the following description and from the accompanying drawing.

Although the improved air valve here referred to is especially designed to be used in connection with wheels for auto cars and similar heavy loaded wheels it can be used, when modified in size, also for light loaded wheels such as in bicycles, though I for the last mentioned purpose prefer the type of my improved air valve which is described in my second patent application filed simultaneously with this one, on September 12th 1916, and bearing the Serial Number 119,624.

In the accompanying drawing the improved air valve is illustrated in approximately its natural size and Figure 1 shows a longitudinal section of the valve when in position for use. Fig. 2 is a detail showing in section the valve opened up for testing the inside pressure with a gage (the gage proper is not shown in the drawing). Fig. 3 is a detail showing in longitudinal section the main portion of the valve proper on an enlarged scale. Fig. 4 is a cross section through the said main portion in the line A—B of Fig. 3.

The wheel rim is represented by the broken portion 1 and the adjacent wall of the pneumatic tire by the portion 2. The valve comprises a sleeve shaped body portion 3 secured to the tire 2 in the usual way by means of an inside flange 4 and an outside plate 5 as well as a locking nut 6, while a nut 7 keeps the body portion 3 in position relatively the wheel rim 1. The bore in the sleeve 3 is of different diameters, so that there will be found three distinct compartments, the compartment 8 adjacent the outer (or free) end of the sleeve being widest, the next compartment 9 somewhat narrower, and the next compartment 10 still narrower.

As will be understood from what is mentioned below the different diameters of the three compartments will not in themselves be of any material importance but they serve to form certain shoulders in the bore which act as abutments for certain of the valve members.

In the outermost compartment 8 there is inserted a nut 11 surrounding a cylindrical member 12 provided at the inner end with a head 13 and on the outer surface with screw threads 14 by means of which the cylinder 12 can be secured to the nut 11 by a locking nut 15. Nearly the entire length of the cylinder 12 is pierced through by a bore 16 which ends above the head 13 where it communicates with lateral holes 17 which as shown in Fig. 4 can be three in number or of any other suitable number. In the range of the mouths of these lateral holes 17 the outside diameter of the cylinder 12 is somewhat decreased to form a recess 18, and a washer 19 of rubber or any other suitable soft material is forced over the cylinder 12 and positioned in the recess 18 thus covering the orifices of the lateral holes 17. In this position the washer 19 is supported by the head 13 and when the nut 15 is tightened, is compressed between the head 13 and the inner end of the nut 11.

The surface of the head 13, which serves as a seat for the washer 19 is somewhat dished, so that a cavity 20 is created between the head 13 and the adjacent face of the washer 19. A spring 21 is applied between the rear surface of the head 13 and the inner shoulder in the sleeve 3 which constitutes the annular bottom of the compartment 9 therein.

The diameter of the compartment 9 is so chosen that, when the cylinder 12 is pushed inward after slackening up the lock nut 15, the head 13 can enter said compartment but the washer 19 cannot. The washer will then, as illustrated in Fig. 2, be caught by the shoulder which forms the annular bottom of the compartment 8 and when the cylinder 12 is pushed farther inward, will be compressed between this shoulder and the upper edge of the recess 18 as clearly shown in Fig. 2. Thus an air tight cut-off for the passage from the inside of the tire will be constituted. A tightening washer 22 may be applied between nut 11 and sleeve 3 and a cap 23 as usual screwed upon the inlet pipe 12.

When inflating the tire the air from the usual air pump is injected through the passage 16 and the lateral orifices 17 against the inner wall of the annular washer 19. By the tightening nut 15 the cylinder 12 is secured in such a position, that the washer 19 is compressed between head 13 and inner end of nut 11, and in an air tight manner covers all the passages to the outside. Even a rather slight pressure of the injected air will force the washer 19 somewhat away from the orifices 17 and thus allow the inrushing air to fill up the cavity 20 where it is allowed to act upon the considerably more extensive annular surface of the washer, thus compressing the washer also in the axial direction. The consequence is, that the washer 19 without any considerable effort will open the inlet passages for the inflating air even, when a rather high pressure is set up in the tire and the washer is compressed by means of the lock nut 15. Of course a slight slacking up of last-mentioned nut will facilitate the entering of the air.

Should it be desirable to test the pressure inside of the tire by means of pressure gage, screwed on the cylinder 12, the cylinder 12 must be pushed inward far enough so that the washer 19 is forced partly out of the recess 18 in the manner described, as shown in Fig. 2—which position of cylinder 12 is necessary also when deflating the tire. To prevent the air from escaping around the cylinder 12, the washer 19 is pressed against the shoulder between compartments 9 and 8 and closes the passage this way, so that only the ordinary passage through orifices 17 and passage 16 is left open. The spring 21 will, after testing is ended, throw the cylinder back into the ordinary position as in Fig. 1, as soon as the gage is removed.

Having thus described my said invention and how it is to be performed, what I claim as new and desire to protect by Letters Patent is:

1. An air valve for pneumatic tires comprising an outer sleeve attached to a tire and communicating with the interior of said tire, an air supply pipe extending within said sleeve, said supply pipe having a bore ending adjacent the inner end of the pipe and lateral openings from said bore communicating with the interior of said sleeve, a head at said inner end of the supply pipe, a nut closing the outer sleeve about the supply pipe, an elastic washer disposed about the supply pipe between and bearing against the inner annular end surface of said nut and the head of the supply pipe and covering the lateral openings of said supply pipe, and a lock nut disposed on the air supply pipe bearing against the first mentioned nut so as to compress the elastic washer between the end surface of said nut and the head of the supply pipe.

2. An air valve for pneumatic tires comprising an outer sleeve attached to a tire and communicating with the interior of said tire, an air supply pipe extending within said sleeve, said supply pipe having a bore ending adjacent the inner end of the pipe and lateral openings from said bore communicating with the interior of said sleeve, a head at said inner end of the supply pipe, a nut closing the outer sleeve about the supply pipe, said supply pipe having an annular recess on the exterior thereof with which said lateral openings communicate, an elastic washer disposed about the supply pipe in said recess so as to cover said lateral openings and bearing against the head of the supply pipe and the inner annular end surface of the said nut, and a lock nut disposed on the air supply pipe bearing against the first mentioned nut so as to compress the elastic washer between the end surface of said nut and the head of the supply pipe.

3. An air valve for pneumatic tires comprising an outer sleeve attached to a tire and communicating with the interior of said tire, an air supply pipe extending within said sleeve, said supply pipe having a bore ending adjacent the inner end of the pipe and lateral openings from said bore communicating with the interior of said sleeve, a head at said inner end of the supply pipe, a nut closing the outer sleeve about the supply pipe, said supply pipe having an annular recess on its exterior with which said openings communicate, the annular surface of said head which faces the said recess having a cavity formed thereon, an elastic washer disposed about the supply pipe in said recess covering the said openings and between and bearing against the head and the inner annular end surface of the nut, and a lock nut about the air supply pipe bearing against the first mentioned nut so as to compress the elastic washer between the end surface of said nut and the head of the supply pipe.

4. An air valve for pneumatic tires comprising an outer sleeve attached to a tire and communicating with the interior of said tire, an air supply pipe extending within said sleeve, said supply pipe having a bore ending adjacent the inner end of the pipe and lateral openings from said bore communicating with the interior of said sleeve, a head at said inner end of the supply pipe, a nut closing the outer sleeve about the supply pipe, said supply pipe having an annular recess on its exterior surface with which said openings communicate, the annular surface of said head which faces the said recess having a cavity formed thereon, an elastic washer disposed about the supply pipe in said recess so as to cover the said openings and bearing against the said head and the inner annular end surface of the nut, a lock nut disposed about the air supply pipe and bearing against the first mentioned nut so as to compress the elastic washer between the end surface of said nut and the head, shoulders formed within the outer sleeve beyond the supply pipe head of such a width that the head can be pushed freely therebetween, the elastic washer being of a larger width so that it cannot pass by said shoulders, and arranged to close the space between said shoulders and the rear edge of said recess of the supply pipe, when pushed in, uncovering the said lateral openings.

5. An air valve for pneumatic tires comprising an outer sleeve attached to a tire and communicating with the interior of said tire, an air supply pipe extending within said sleeve, said supply pipe having a bore ending adjacent the inner end of the pipe and lateral openings from said bore communicating with the interior of said sleeve, a head at said inner end of the supply pipe, a nut closing the outer sleeve about the supply pipe, an elastic washer disposed about the supply pipe between and bearing against the inner annular end surface of said nut and the head of the supply pipe, covering the said lateral openings of the bore in the supply pipe, a lock nut disposed on the air supply pipe bearing against the first mentioned nut so as to compress the elastic washer between the end surface of said nut and the head, a spring disposed between and bearing against the head and a shoulder within the outer sleeve so as to maintain the air supply pipe in its ordinary position, as and for the purpose set forth.

In testimony whereof I have affixed my signature in presence of two witnesses.

ERNST ALFRED HILDING.

Witnesses:
ADOLF MOLIN,
EINAR JANSON.

Copies of this patent may be obtained for five cents each, by addressing the "Commissioner of Patents, Washington, D. C."